US009208623B2

(12) United States Patent
Baumert et al.

(10) Patent No.: US 9,208,623 B2
(45) Date of Patent: Dec. 8, 2015

(54) VEHICLE BUS ACCESS POINT SYSTEM AND METHOD

(75) Inventors: Joel Baumert, Eden Prairie, MN (US); Joel K. Young, Eden Prairie, MN (US); Curt Ahart, Shorewood, MN (US)

(73) Assignee: Digi International Inc., Minnetonka, MN (US)

( * ) Notice: Subject to any disclaimer, the term of this patent is extended or adjusted under 35 U.S.C. 154(b) by 264 days.

(21) Appl. No.: 13/544,725

(22) Filed: Jul. 9, 2012

(65) Prior Publication Data

US 2014/0011483 A1 Jan. 9, 2014

(51) Int. Cl.
*H04M 3/42* (2006.01)
*G07C 5/00* (2006.01)

(52) U.S. Cl.
CPC .................................... *G07C 5/008* (2013.01)

(58) Field of Classification Search
CPC .. H04M 2207/18; H04W 4/008; H04W 88/02
USPC ........................................... 455/426.1, 414.1
See application file for complete search history.

(56) References Cited

U.S. PATENT DOCUMENTS

2005/0096805 A1* 5/2005 Fudali et al. .................... 701/29
2005/0228558 A1 10/2005 Valette et al.
2008/0030376 A1 2/2008 Tunnell et al.
2009/0258642 A1* 10/2009 Golenski .................... 455/426.1
2010/0191410 A1 7/2010 Torlo et al.

FOREIGN PATENT DOCUMENTS

WO 2006005628 1/2006

OTHER PUBLICATIONS

European Patent Office, "Extended European Search Report", "from Foreign Counterpart of U.S. Appl. No. 13/544,725", Oct. 25, 2013, pp. 1-7, Published in: EP.

LAN/MAN Standards Committee of the IEEE Computer Society, "Part 11: Wireless LAN Media Access Control (MAC) and Physical Layer (PHY) Specifications ", "IEEE Standard for Information technology", Mar. 29, 2012, pp. xi-xii and 1-96, Publisher: IEEE Standards Association.

* cited by examiner

*Primary Examiner* — Kwasi Karikari
(74) *Attorney, Agent, or Firm* — Fogg & Powers LLC

(57) ABSTRACT

A system and method of transmitting vehicle information from a vehicle to a server across an external network. A vehicle bus connector module is plugged into a vehicle bus through the vehicle's vehicle bus connector. The vehicle bus connector module is also communicatively connected to a personal communications device. Vehicle information is collected from the vehicle bus and combined with information captured by the personal communications device to form a driver log. The driver log is transmitted to the server via the external network.

35 Claims, 9 Drawing Sheets

VEHICLE BUS ACCESS POINT SYSTEM AND METHOD

BACKGROUND

Many vehicles today include a vehicle bus. A vehicle bus is an internal communications network for the vehicle that is used to connect control modules and sensors installed in the vehicle. Modules plugged into the network communicate with each other using a predefined network protocol. Control modules receive input from sensors attached to the vehicle bus network and use the input to control other modules over the network.

Many vehicle busses include connectors that can be used by external devices to access modules on the vehicle bus network. Since 1996, all cars sold in the United States are required to have an On-Board Diagnostics (ODB) connector. The ODB connector can be used to access the car's electronic controllers. An ODB-II connector is included in many of the cars manufactured for the U.S. market today.

As noted above, each vehicle bus employs a predefined network protocol. In the United States, commercial vehicles use the SAE J1939 vehicle bus standard for communication and diagnostics among vehicle components. Fleet managers use external access to the vehicle bus of their fleet vehicles to monitor the performance and usage of their vehicles. One approach is to use a telematics solution to access information on the vehicle bus.

Typical telematics solutions include a Cellular module, a Vehicle Bus, a display, and a complicated mess of wiring and antennas. One such approach is to use a ConnectPort® X5 gateway manufactured by Digi International Inc. of Minnetonka, Minn. to access a SAE J1939 vehicle bus. The ConnectPort X5 gateway provides remote connectivity, over a number of communications protocols, to mobile assets to monitor operating health, performance, location and driver/operator behavior.

Xata Turnpike RouteTracker is a module manufactured by Xata Corporation of Eden Prairie, Minn. that connects via a cable to the vehicle diagnostic port. The RouteTracker captures GPS data and reads engine diagnostic information. The GPS and engine diagnostic information is transmitted via Bluetooth to a smartphone in the vehicle and, through the smartphone, to Xata Turnpike's hosted web site.

Finally, Xirgo Technologies of Camarillo, Calif. manufactures a module that connects to the diagnostic port of a vehicle to provide a cellular interface to the vehicle telematics system.

Current telematics solutions tend to be complicated and costly. What is needed is a system and method for providing telematics solutions in a more efficient manner.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
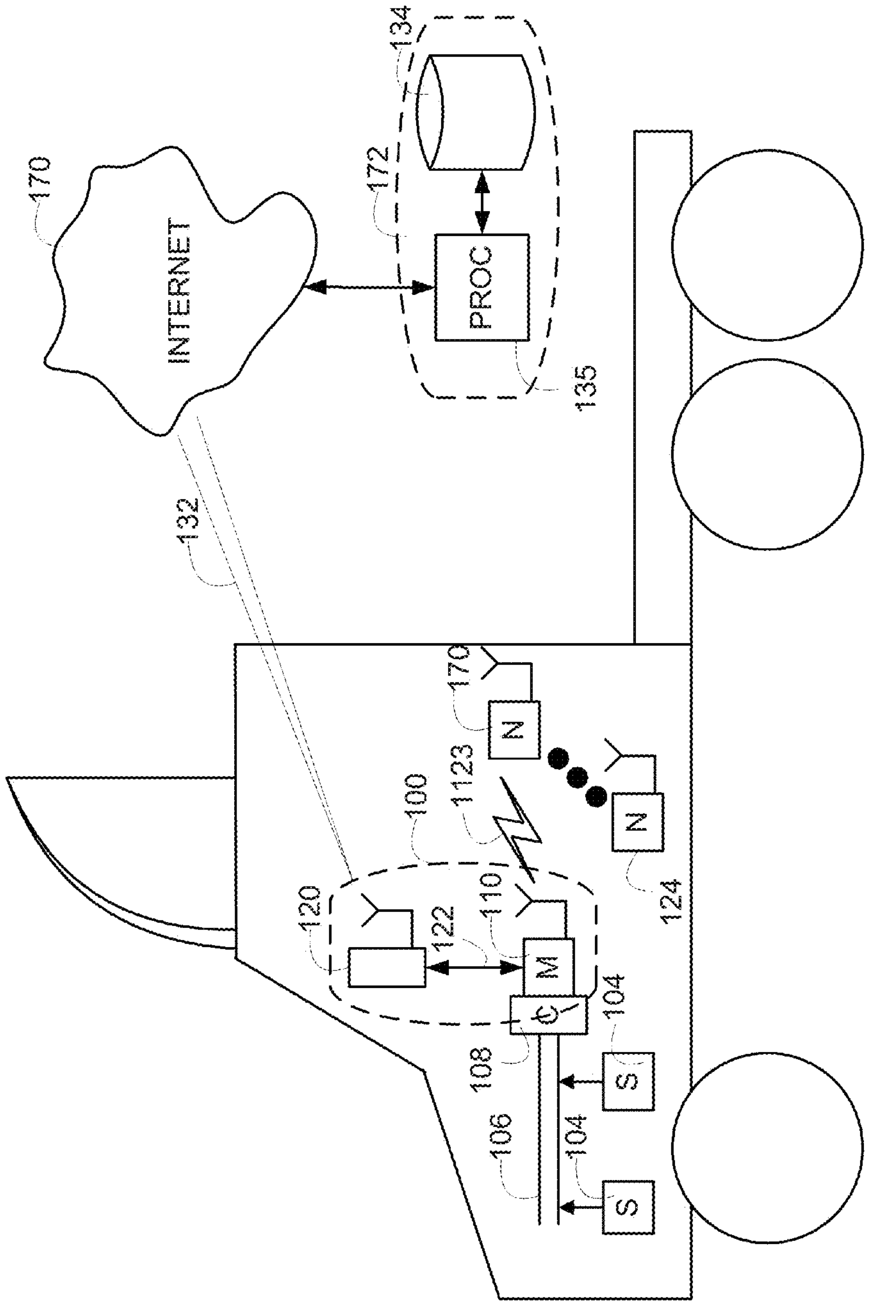
FIG. 1 illustrates an example telematics system.

A telematics system is shown in FIG. 1. In the example shown in FIG. 1, telematics system 100 is connected to vehicle 102 through its vehicle bus 106. Vehicle 102 includes one or more control modules 104 connected across vehicle bus 106. Vehicle bus 106 includes a vehicle bus connector 108. In the embodiment shown, telematics system 100 is connected to vehicle bus 106 via vehicle bus connector 108.

In some embodiments, vehicle bus connector 108 is an ODB connector such as, for example, an ODB II connector. In other embodiments, vehicle bus connector 108 is a connector used in commercial vehicles, such as a SAE J1939 connector.

In the embodiment shown in FIG. 1, telematics system 100 includes a vehicle bus connector module 110 connected to vehicle bus connector 108 and to a personal communications device 120. In one such embodiment, personal communications device 120 includes a cellular interface, a wireless interface, a Global Positioning Satellite (GPS) receiver and a telematics application. In one embodiment, the application executing on personal communications device 120 communicates with the vehicle bus connector module to obtain vehicle information from the vehicle bus, combines the vehicle information with data from the GPS receiver to form vehicle location and operation information associated with the vehicle and transmits the vehicle location and operation information across a cellular network to a central server.

In one embodiment, such as is shown in FIG. 1, vehicle bus connector module 110 is connected to personal communications device 120 via a wired connection 122 (such as, for instance, a Universal Serial Bus (USB)). In another embodiment, vehicle bus connector module 110 is connected to personal communications device 120 via a wireless connection 1123 such as, for instance, a Wi-Fi connection. An advantage of the wired connection is that power can be supplied to the personal communications device across the wired connection.

In one embodiment the wired connection to connector module 110 is used by connected Wi-Fi devices 124 or by personal communications device 120 to write files to USB-connected storage (not shown).

In one ODB embodiment, connector module 110 is an ODB-II compatible connector. In one commercial embodiment, connector module 110 is a SAE 1939 compatible connector.

In one embodiment, connector module 110 includes a connector interface 112 which can be coupled to vehicle bus connector 108, a USB interface 114, a Wi-Fi interface 116 and a controller 111. Interface 112 is coupled to vehicle bus connector 108. In one embodiment, Wi-Fi interface 116 includes a Wi-Fi antenna 118.

Figure 2:
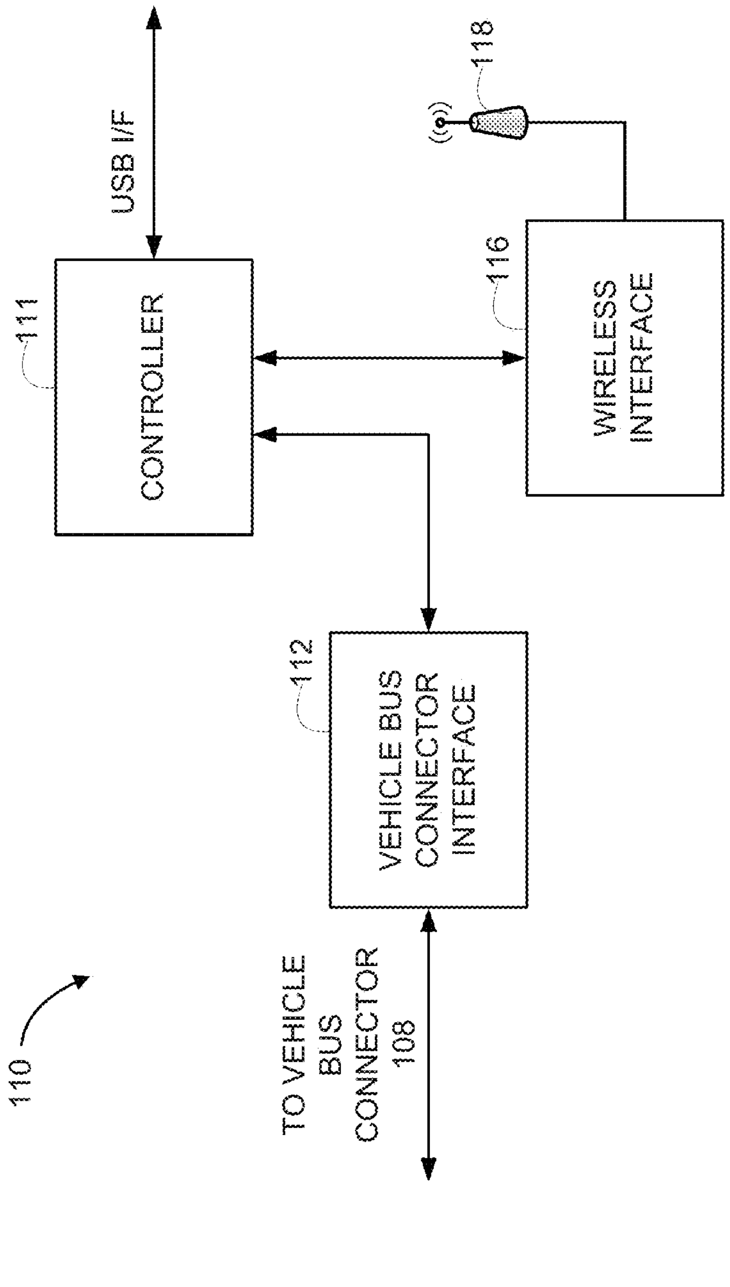
FIG. 2 illustrates one example embodiment of a vehicle bus connector module which can be used in the telematics system of FIG. 1.

In the embodiment shown, as is shown in FIG. 2, controller 111 is connected to the connector interface 112 and to the Wi-Fi interface 116. In one such embodiment, controller 111 establishes the connector module 110 as a wireless access point, receives vehicle information via the connector interface 112 and transmits the vehicle information to devices communicating with the wireless access point.

Figure 3:
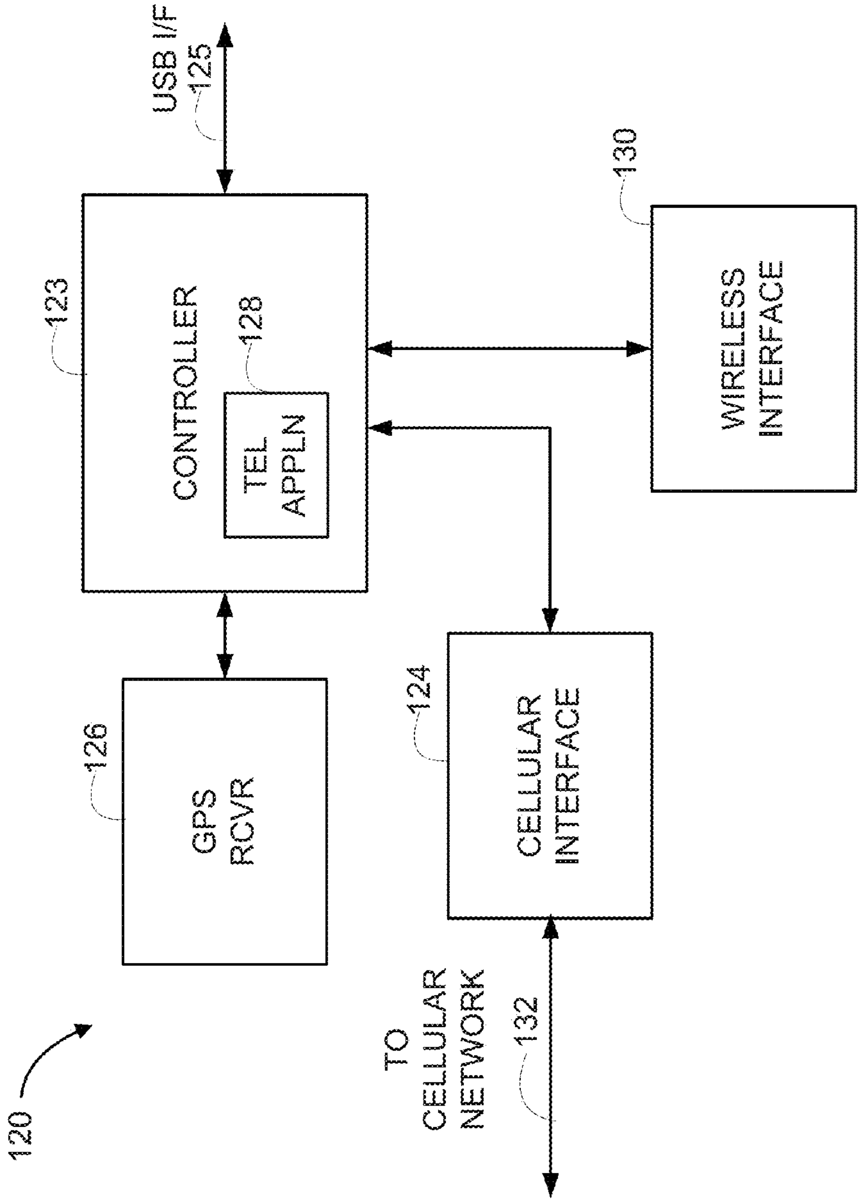
FIG. 3 illustrates one example embodiment of a personal communications device which can be used in the telematics system of FIG. 1.

In one embodiment, as is shown in FIG. 3, personal communications device 120 includes a controller 123 connected to a cellular interface 124, a USB interface 125 and a Global Positioning Satellite (GPS) receiver 126. Controller 123 includes a telematics application 128. Telematics application 128, executing on controller 123, communicates with the connector module 110 through wired connection 122 via USB interface 124 to obtain vehicle information from control modules 104 across vehicle bus 106. In one embodiment, personal communications device 120 combines the vehicle information with data from GPS receiver 126 to form vehicle location and operation information associated with the vehicle and transmits the vehicle location and operation information across a cellular network 132 to a central server 172 that houses driver log database 134. In one such embodiment, personal communications device 120 receives power over USB interface 124.

In one embodiment, personal communications device 120 also includes a wireless interface 130 capable of communication with the wireless interface of module 110. In one such embodiment, personal communications device 120 operates as a wireless access point.

In one embodiment, personal communications device 120 is a smart phone running applications on an operating system such as iOS or Android. In another embodiment, personal communications device 120 is a tablet or personal computer having a cellular modem.

An advantage of the telematics system of FIG. 1 is that it is a simple method for connecting a vehicle bus to a commodity personal communications device such as a smart phone, personal computer or tablet. Such an approach takes a considerable amount of cost out of the telematics system, while also providing a flexible solution that can be easily upgraded as the technology of personal communications devices advances. Once connected, the smart phone, tablet or personal computer becomes part of the telematics system, and is capable of communicating to other devices through the wireless access point, and to a telematics server via either its cellular connection, or through other Wi-Fi systems.

An advantage of the USB connection between module 110 and personal communications device 120 is that the typical GPS receiver in device 120 drains power in device 120 when used frequently, as in a typical telematics application. The power drain is offset by power supplied over the USB interface.

In addition, Wi-Fi interfaces are easy to configure. The Wi-Fi access point of connector module 112 is easily configured via the personal communications device. Finally, a Wi-Fi based OBD-2 device makes it possible for a vehicle bus connected insurance tracker to connect to vehicle control systems via a Smart Phone, Home network, metropolitan Wi-Fi, or Wi-Fi hotspot.

Figure 4:
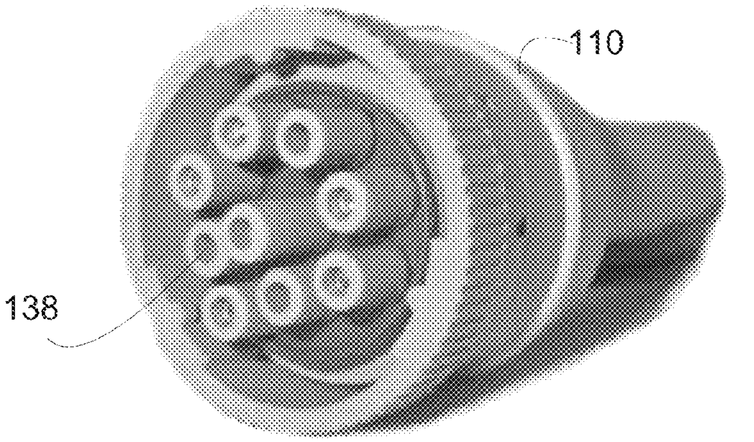
FIG. 4 illustrates another example embodiment of a vehicle bus connector module which can be used in the telematics system of FIG. 1.
Figure 5:
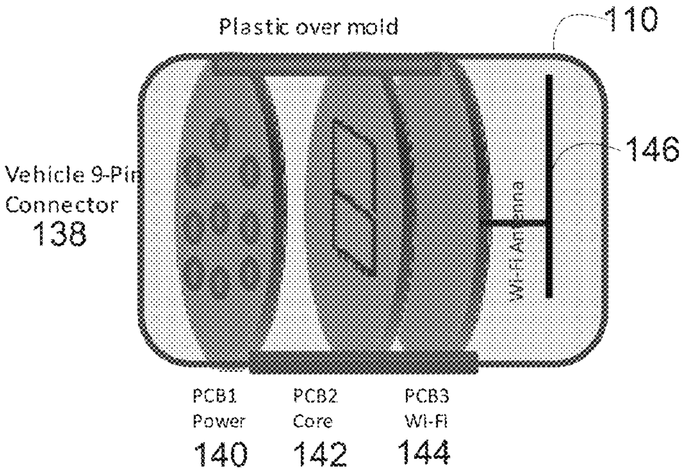
FIGS. 5 and 6 illustrate example embodiments of the vehicle bus connector module of FIG. 4.

An example embodiment of a vehicle bus connector module 110 is shown in FIGS. 4 and 5. In the embodiment shown in FIGS. 4 and 5, a J1708/CAN connector has been elongated to create space for three printed circuit boards (140, 142 and 144) and an antenna 146. In the embodiment shown, printed circuit board 140 includes power circuitry, printed circuit board 142 includes core electronics and printed circuit board 144 includes Wi-Fi circuitry for wireless interface 116. An antenna 146 connected to printed circuit board 144 receives and transmits the Wi-Fi signals. In the example embodiment shown in FIG. 4 includes multiple connector pins 138 configured to mate with vehicle bus connector 108.

Figure 6:
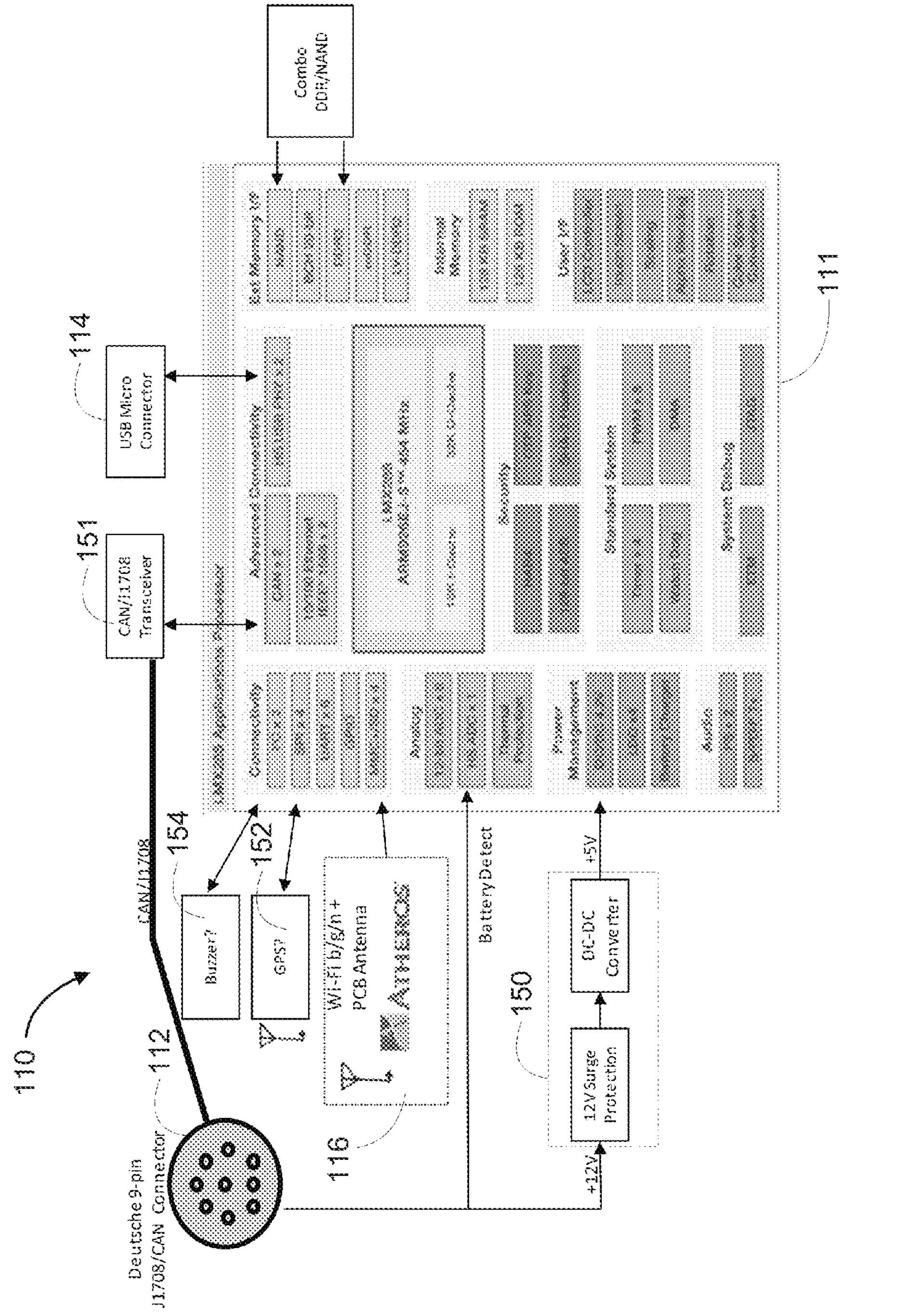

A more detailed illustration of one example embodiment of vehicle bus connector module 110 is shown in FIG. 6. In the example embodiment shown in FIG. 6, controller 111 is a Freescale i.MX285 Multimedia Applications Processor available from Freescale Semiconductor of Austin, Tex. Wireless interface 116 is an Atheros wireless-N circuit. In the example shown in FIG. 6, power conditioning 150 conditions power received from vehicle bus connector 108. In some embodiments, module 110 includes a GPS receiver 152 and a buzzer 154. In one such embodiment, buzzer 154 buzzes to indicate that the connection between module 110 and personal communications device 120 has been dropped.

In the example embodiment shown in FIG. 6, USB interface 114 is a female micro USB connector. In one such embodiment, in operation, a USB cable 122 is connected between module 110 and personal communications device 120. Cable 122 transfers driver log data between module 110 and personal communications device 120. A CAN/J1708 transceiver 151 is used to communicate from controller 111 through connector 112 to vehicle bus 106.

Figure 7:
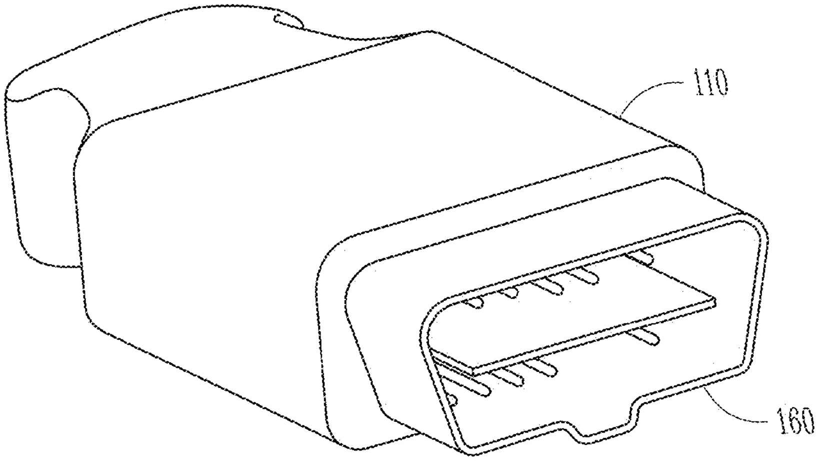
FIG. 7 illustrates another example embodiment of a vehicle bus connector module which can be used in the telematics system of FIG. 1.

Another example embodiment of a vehicle bus connector module 110 is shown in FIG. 7. In the embodiment shown in FIG. 7, an OBD-II connector has been elongated to create space for printed circuit boards and for an antenna. In one such embodiment, the antenna receives and transmits Wi-Fi signals as module 110 acts as a wireless access point. In one example embodiment, a female micro USB connector is located opposite the OBD-II connector pins 160. In another example embodiment, a USB cable (not shown) extends out from module 110. The USB cable can be attached, for instance, to a personal communications device 120, or to other devices, such as storage devices.

In one embodiment telematics application 128 is split between control 111 operating in module 110 and controller 123 operating in personal communications device 120. In some such embodiments, there is cooperation between an application executing in vehicle bus control module 110 and the application running in the cellular phone in order to ensure regulatory compliance. In one such embodiment, personal communications device 120 (e.g., a phone) provides server connectivity, driver/vehicle history information, input from the driver, and GPS data while module 110 provides information about the truck and an interface for downloading driver logs to a USB stick. A representative compliance application needs to take the various inputs from servers, driver, and vehicle and process them into log data that is used to demonstrate compliance. Processing of the inputs could be done solely on the phone, solely on the vehicle bus adapter, or as portions allocated between the two as long as the log data makes it to the back end servers and onto a USB stick on demand.

In one embodiment, each vehicle bus connector module 110 includes a USB interface 114. USB interface 114 is used, for instance, to download driver logs to law enforcement personnel when requested.

Figure 8:
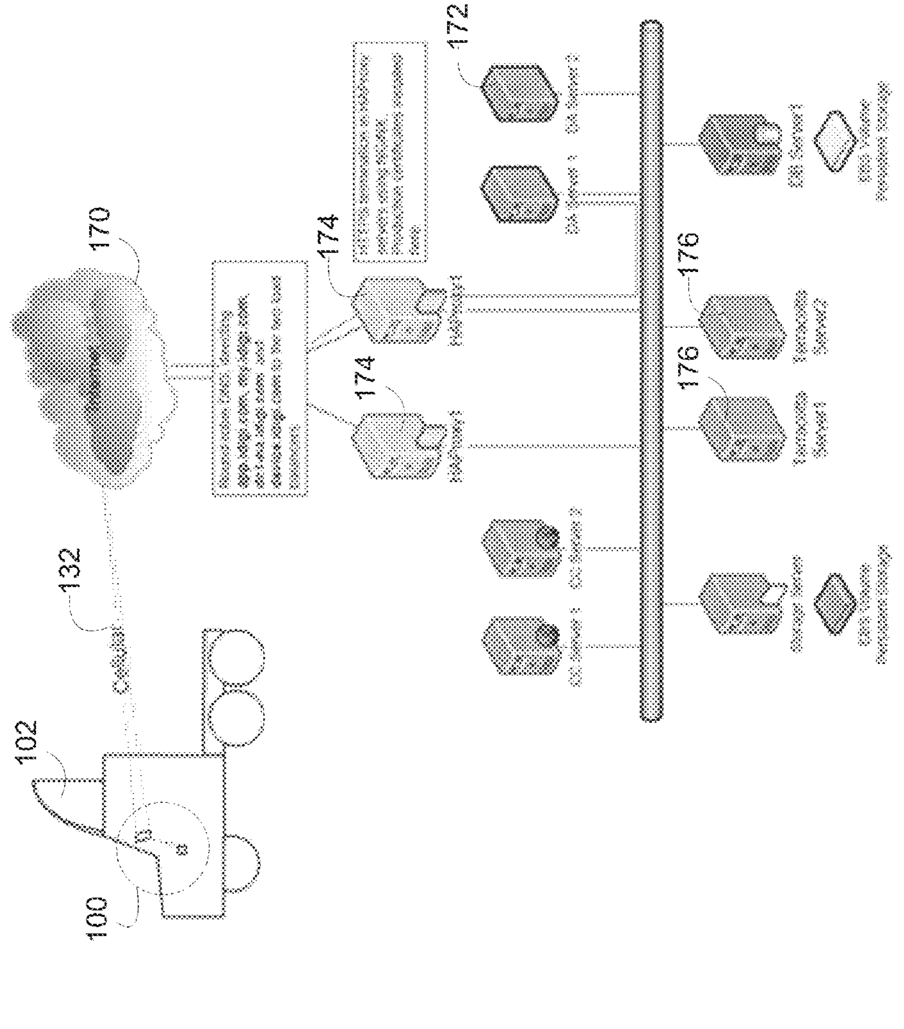
FIG. 8 illustrates another example embodiment of a vehicle bus connector module which can be used in the telematics system of FIG. 1.

In one embodiment, telematics system 100 connects through the cellular or wireless networks 132 to the Internet 170 and through the Internet 170 to server 172. An example of such an embodiment is shown in FIG. 8. In the example embodiment shown in FIG. 8, system 100 connects to servers 172 via a proxy server 174. In one such embodiment, two or more proxy servers 174 serve as load balancers.

In one embodiment, HTTPS terminates in proxy servers 174.

In one embodiment, driver logs are stored in servers 172. Driver logs for commercial vehicles can be accessed by law enforcement. In one embodiment, law enforcement personnel access driver logs via USB interface 114. An officer attaches a device to USB interface 114 and reads the file stored in server 172. One example embodiment is shown in FIG. 9.

Figure 9:
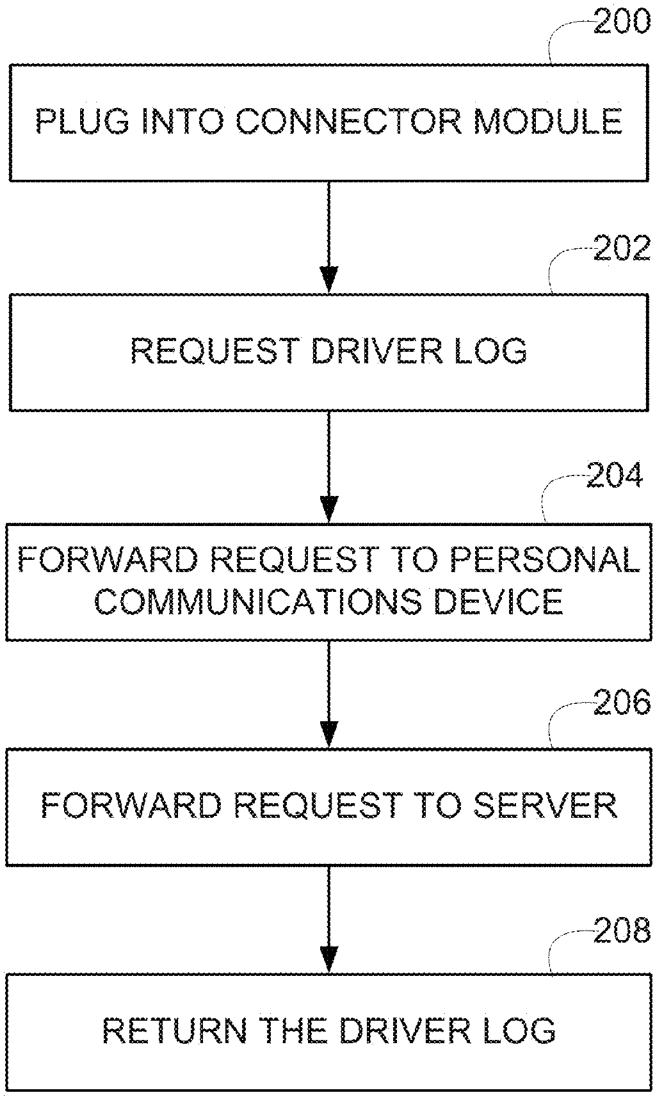
FIG. 9 illustrates an example embodiment of a vehicle bus monitoring system.

In the example embodiment shown in FIG. 9, at 200, an officer plugs a USB device into USB interface. To facilitate such an action, in one embodiment, a USB cable extends out from module 110 to a mini USB connector. The office plugs the USB cable into the driver log reading device at 200 and requests the driver log at 202. In one embodiment, the request is forwarded, at 204, from connector module 110 to personal communications device 120 and from there to server 172 at 206. Server 172 returns the driver log file to the driver log reading device at 208.

Figure 10:
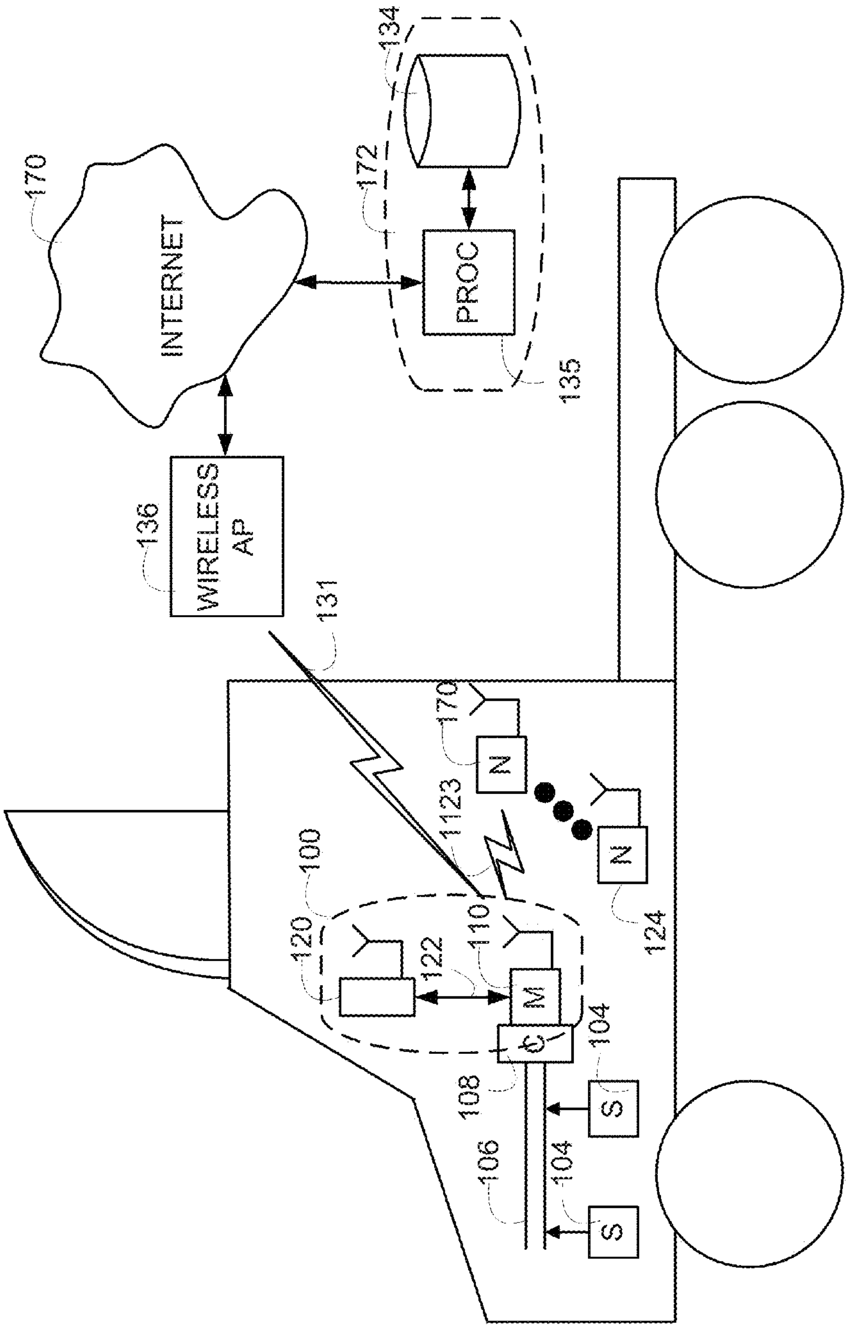
FIG. 10 is another example telematics system.

In one alternate embodiment, the request is forwarded from connector module 110 through Wi-Fi access point 136 to server 172 through wireless interface 116 when connector module 110 comes within range of Wi-Fi access point 136. In one embodiment, a compliance application (such as telematics application 128) executing on personal communications device 120 requests information from the vehicle bus connector module 110 via web services, formats the driver log and sends the driver log to the vehicle bus connector module 110 via web services. Module 110, when it detects access point 136, initiates a transfer of accumulated driver logs through access point 136 to server 172. One example embodiment is shown in FIG. 10.

In an alternative embodiment, personal communications device 120 communicates directly to Wi-Fi access point 136; an application running on device 120 detects access point 136, makes a connection to access point 136 and initiates the transfer through access point 136 to server 172.

In one embodiment, either connector module 110 or personal communications device 120 initiate a transfer through access point 136 using a physical button and user interface application executing fully or partially on device 120. In one such embodiment, an application executing on personal communications device 120 decides which external network to connect to based on a trusted third party (potentially including authentication information).

In one embodiment, an application executing on module 110 includes a driver which connects to nearby adapters based on input from a driver.

In one embodiment, server 172 is a government server and telematics application 128 delivers the driver logs to the government server periodically, or based on a trigger initiated by the driver.

In one embodiment, personal communications device 120 posts GPS and driver information to the vehicle bus connector module 110 and module 110 combines that with engine information into a driver log.

As noted above, establishing vehicle bus connector module 110 as a wireless access point simplifies the connection to a smartphone or other such device, while eliminating the need for separate displays. Module 110 plugs directly into the vehicle bus connector 108 and communicates with a smartphone, tablet or other such computer to transfer information from the vehicle bus to the smart phone, tablet or other such computer. Since module 110 plugs directly into vehicle bus connector 108, it receives power from the vehicle bus, reducing complicated wiring.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein. It is intended that this invention be limited only by the claims, and the full scope of equivalents thereof.

What is claimed is:

1. A system, comprising:

a vehicle having a vehicle bus and one or more control modules connected to the vehicle bus, wherein the vehicle bus includes a vehicle bus connector; and a telematics system including:

a vehicle bus connector module, wherein the vehicle bus connector module includes:

a connector interface, wherein the connector interface is configured to be coupled to the vehicle bus connector;

a wireless interface, wherein the wireless interface includes an antenna; and a controller connected to the connector interface and to the wireless interface, wherein the controller establishes the vehicle bus connector module as a wireless access point, wherein the wireless access point is configured to create a wireless network facilitating connection of at least one wireless access device to the vehicle bus connector module in the wireless network, wherein the controller receives vehicle information from the vehicle bus connector via the connector interface and transmits the vehicle information to the at least one wireless access device through the wireless network via the wireless access point of the vehicle bus connector module; and a personal communications device in addition to the at least one wireless access device and communicatively coupled to the wireless access point of the vehicle bus connector module, wherein the personal communications device includes a cellular interface, a wireless interface, a Global Positioning Satellite (GPS) receiver and a telematics application, wherein the personal communication device is configured to communicate with the at least one wireless access device through the wireless access point of the vehicle bus connector module;

wherein the application communicates with the controller to obtain vehicle information from the vehicle bus, combines the vehicle information with data from the GPS receiver to form vehicle location and operation information associated with the vehicle and transmits the vehicle location and operation information across a cellular network to a central server.

2. The system of claim 1, wherein the wireless network is a Wi-Fi network and wherein the wireless access point is a Wi-Fi access point.

3. The system of claim 1, wherein the controller includes a phone-home application, wherein the phone-home application detects the presence of another wireless network, determines if there is vehicle information to be transmitted to the central server and, if there is vehicle information to be transmitted to the central server, transmits the vehicle information through the another wireless network to the central server.

4. The system of claim 1, wherein the telematics application executing on the personal communications device includes a phone-home application, wherein the phone-home application detects the presence of another wireless network, determines if there is vehicle location and operation information to be transmitted to the central server and, if there is vehicle location and operation information to be transmitted to the central server, transmits the vehicle information through the another wireless network to the central server.

5. The system of claim 1, wherein the telematics application determines if the cellular network is currently being used by another application and, if so, stores the vehicle location and operation information to a log file on the personal communications device.

6. The system of claim 1, wherein the vehicle bus connector module further includes a buzzer.

7. The system of claim 1, wherein the personal communications device communicates with the controller over a wireless local area network.

8. The system of claim 7, wherein the wireless local area network is a Wi-Fi network.

9. The system of claim 1, wherein the personal communications device communicates with the controller over a wired connection.

10. The system of claim 9, wherein the wired connection is a Universal Serial Bus (USB) connection; and wherein the vehicle bus connector module includes a USB interface which, when connected to a computing device, transfers data from the controller to the computing device, wherein the data includes vehicle information received from the vehicle bus connector.

11. The system of claim 10, wherein the telematics application on the personal communications device maintains a driver log, wherein the driver log is accessible via a USB interface on the personal communications device.

12. The system of claim 10, wherein the controller maintains a driver log, wherein the driver log is accessible via the USB interface on the vehicle bus connector module.

13. A vehicle bus connector module, comprising:

a connector interface, wherein the connector interface is configured to be coupled to a vehicle bus connector;

a wireless interface, wherein the wireless interface includes an antenna; and a controller connected to the connector interface and to the wireless interface, wherein, when connected to a vehicle bus connector, the controller establishes the vehicle bus connector module as a wireless access point, wireless access point is configured to create a wireless network facilitating connection of at least one wireless access device to the vehicle bus connector module in the wireless network, wherein the controller receives vehicle information from the vehicle bus connector via the connector interface and transmits the vehicle information to the at least one wireless access device through the wireless network via the wireless access point of the vehicle bus connector module;

wherein the controller includes a phone-home application configured to detect the presence of another wireless network, determine if there is vehicle information to be transmitted to a central server and, if there is vehicle information to be transmitted to the central server, transmit the vehicle information through the other wireless network to the central server.

14. The vehicle bus connector module of claim 13, wherein the vehicle bus connector module further includes a buzzer.

15. The vehicle bus connector module of claim 13, wherein the controller includes a USB interface, wherein the USB interface, when connected to a computing device, is capable of transferring data from the controller to the computing device, wherein the data includes vehicle information received from the vehicle bus connector.

16. The vehicle bus connector module of claim 13, wherein the controller maintains a driver log, wherein the driver log is accessible via the USB interface.

17. The vehicle bus connector module of claim 13, wherein the controller includes a personal communications device application which, in the presence of a personal communications device, communicates vehicle information received from the vehicle bus to the personal communications device.

18. A method of transmitting vehicle information from a vehicle across an external network to a server, wherein the vehicle includes a vehicle bus, the method comprising:

connecting a vehicle bus connector module to the vehicle bus through its vehicle bus connector, wherein the vehicle bus connector module includes a wireless interface and a controller, wherein the wireless interface includes a wireless antenna and wherein the controller is connected to the wireless interface;

establishing the vehicle bus connector module as a wireless access point, wherein the wireless access point is configured to create a wireless network facilitating connection of at least one wireless access device to the vehicle bus connector module in the wireless network;

connecting the at least one wireless access device to the vehicle bus connector module in the wireless network;

receiving, at the vehicle bus connector module and via the vehicle bus connector, vehicle information received from the vehicle bus connector;

communicatively connecting a personal communications device to the wireless access point of the vehicle bus connector module, wherein the personal communications device is connected to a cellular network, wherein the personal communication device is distinct from the at least one wireless access device, wherein the personal communication device is configured to communicate with the at least one wireless access device through the wireless access point of the vehicle bus connector module;

collecting vehicle information from the vehicle bus;

combining the vehicle information with information from the personal communications device to form driver logs; and transmitting the driver logs to the server via the external network.

19. The method of claim 18, wherein combining the vehicle information includes displaying, on the personal communications device, a portion of the vehicle information received from the vehicle bus connector module.

20. The method of claim 18, wherein the personal communications device includes a GPS receiver and wherein combining the vehicle information includes:

determining a vehicle location using the GPS receiver; and adding the vehicle location information to the vehicle information.

21. The method of claim 18, wherein the personal communications device includes a GPS receiver and wherein combining the vehicle information includes:

determining a vehicle location using the GPS receiver;

adding the vehicle location information to the driver logs; and displaying, on the personal communications device, a portion of the driver logs.

22. The method of claim 18, wherein combining the vehicle information includes queuing the vehicle information within the personal communications device.

23. A method of monitoring driver logs, the method comprising:

connecting a vehicle bus connector module to the vehicle bus through a vehicle bus connector of the vehicle bus, wherein the vehicle bus connector module includes a wireless interface and a controller, wherein the wireless interface includes a wireless antenna and wherein the controller is connected to the wireless interface;

receiving, at the vehicle bus connector module and via the vehicle bus connector, vehicle information received from the vehicle bus connector;

storing the vehicle information as driver logs;

establishing a wireless connection between a personal communications device and the vehicle bus connector module of the vehicle as a wireless access point, wherein the wireless access point is configured to create a wireless network facilitating connection of at least one wireless access device to the vehicle bus connector module in the wireless network, wherein the personal communications device is connected to an external network;

connecting at least one wireless access device to the wireless access point of the vehicle bus connector module, wherein the personal communications device is configured to communicate with the at least one wireless access device through the wireless access point of the vehicle bus connector module;

transmitting the driver logs to a server via the external network;

receiving, from a requesting device, a request at the vehicle bus connector module for a driver log associated with a particular driver;

requesting from the server a copy of the driver log associated with that driver;

receiving the driver log at the vehicle bus connector module and transmitting the driver log from the vehicle bus connector module to the requesting device.

24. The method of claim 23, wherein the personal communications device includes a GPS receiver and wherein transmitting the vehicle information includes:

determining a vehicle location using the GPS receiver; and adding the vehicle location information to the driver logs.

25. The method of claim 23, wherein the control module creates the wireless access point and wherein the requesting device requests the driver log by connecting to the wireless access point.

26. The method of claim 23, wherein the control module includes a USB interface, wherein the requesting device requests the driver log via the USB interface.

27. The method of claim 23, wherein transmitting the driver logs includes queuing the driver logs before transmitting them to the server.

28. A system, comprising:

a vehicle having a vehicle bus and one or more control modules connected to the vehicle bus, wherein the vehicle bus includes a vehicle bus connector;

a driver log tracking system, wherein the driver log tracking system includes a driver log database; and a telematics system including:

a vehicle bus connector module, wherein the vehicle bus connector module includes:

a connector interface, wherein the connector interface is configured to be coupled to the vehicle bus connector;

a wireless interface, wherein the wireless interface includes an antenna; and a controller connected to the connector interface and to the wireless interface, wherein the controller establishes the vehicle bus connector module as a wireless access point, wherein the wireless access point is configured to create a wireless network facilitating connection of at least one wireless access device to the vehicle bus connector module in the wireless network, wherein the controller receives vehicle information from the vehicle bus connector via the connector interface and transmits the vehicle information to the at least one wireless access device through the wireless network via the wireless access point of the vehicle bus connector module; and a personal communications device in addition to the at least one wireless access device and communicatively coupled to the wireless access point of the vehicle bus connector module, wherein the personal communications device includes a cellular interface, a wireless interface, a Global Positioning Satellite (GPS) receiver and a telematics application, wherein the personal communication device is configured to communicate with the at least one wireless access device through the wireless access point of the vehicle bus connector module;

wherein the application communicates with the controller to obtain vehicle information from the vehicle bus, combines the vehicle information with data from the GPS receiver to form vehicle location and operation information associated with the vehicle and transmits the vehicle location and operation information across an Internet connection to the driver log tracking system.

29. The system of claim 28, wherein the wireless network is a Wi-Fi network and wherein the wireless access point is a Wi-Fi access point.

30. The system of claim 28, wherein the controller includes a phone-home application, wherein the phone-home application detects the presence of another wireless network, determines if there is vehicle information to be transmitted to the central server and, if there is vehicle information to be transmitted to the central server, transmits the vehicle information through the other wireless network to the driver log tracking system.

31. The system of claim 28, wherein the telematics application executing on the personal communications device includes a phone-home application, wherein the phone-home application detects the presence of another wireless network, determines if there is vehicle location and operation information to be transmitted to the driver log tracking system and, if there is vehicle location and operation information to be transmitted to the driver log tracking system, transmits the vehicle information through the other wireless network to the driver log tracking system.

32. The system of claim 28, wherein the telematics application queues the vehicle location and operation information to a log file on the personal communications device for transfer to the driver log tracking system.

33. The system of claim 28, wherein the vehicle bus connector module includes a USB interface which, when connected to a computing device, transfers driver log data from the controller to the computing device, wherein the data includes vehicle information received from the vehicle bus connector.

34. The system of claim 28, wherein the telematics application on the personal communications device maintains a driver log, wherein the driver log is accessible via a USB interface on the personal communications device.

35. The system of claim 28, wherein the controller maintains a driver log, wherein the driver log is accessible via the USB interface on the vehicle bus connector module.

* * * * *